UNITED STATES PATENT OFFICE.

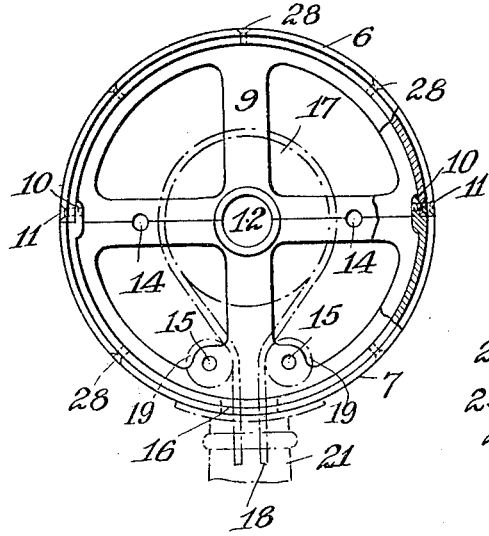
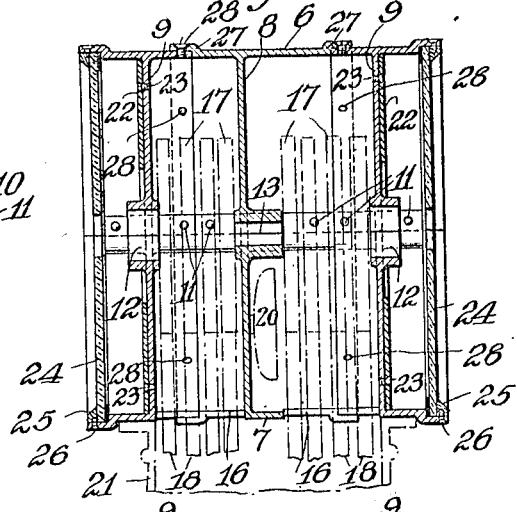
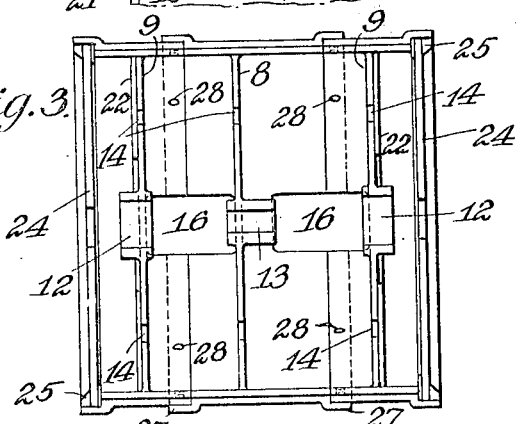
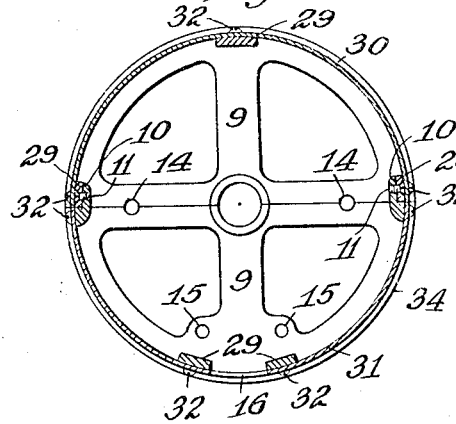
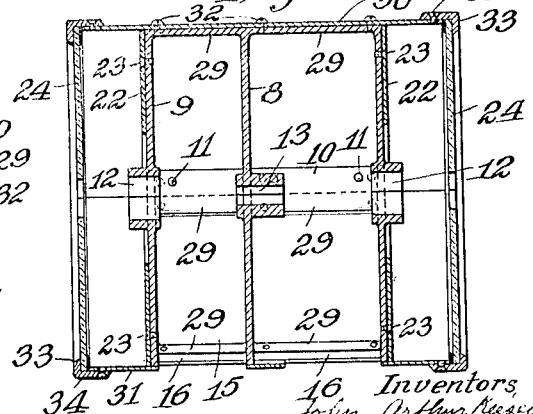

JOHN ARTHUR KEESEY, OF BROOKLYN, NEW YORK, AND ALFRED SHEDLOCK, OF CANNONDALE, CONNECTICUT; SAID SHEDLOCK ASSIGNOR TO SAID KEESEY.

CASING FOR SIGNALING APPARATUS.

1,292,481.      Specification of Letters Patent.      Patented Jan. 28, 1919.

Original application filed September 28, 1917, Serial No. 193,631. Divided and this application filed July 5, 1918. Serial No. 243,368.

*To all whom it may concern:*

Be it known that we, JOHN ARTHUR KEESEY and ALFRED SHEDLOCK, citizens of the United States, residing, respectively, at Brooklyn, county of Kings, State of New York, and Cannondale, Fairfield county, State of Connecticut, have jointly invented new and useful Improvements in Casings for Signaling Apparatus, of which the following is a specification.

The subject matter of this invention is shown and described in our application for Letters Patent for signaling apparatus, filed September 28, 1917, Serial Number 193,631. It relates to casings for signaling apparatus and is adapted to hold and protect a number of mechanical signaling devices, each designed to operate as an individual unit in conjunction with a message sending and receiving apparatus located at a distant station. In a multi-message sending and receiving apparatus it is very advantageous that the casing be so constructed that all of the operating parts and devices may be fully exposed in complete working condition to facilitate inspecting, assembling and adjusting the same. This being the object of this invention the casing is centrally horizontally divided, the lower half of the casing being so constructed as to hold all of the working parts and devices in such manner as to cause them to properly functionate, in combination with other apparatus, when the upper half of the casing is removed.

Each half of the casing comprises a shell, preferably semi-cylindrical, and web frames having bearings at their central horizontal planes for the reception of the main shafts of the mechanisms; they also carry one half of centrally divided dials and one half of glass plates which constitute end covers to fully protect the mechanism contained in the casing.

To further elucidate this invention we will now refer to the accompanying drawings, in which:

Figure 1, is a longitudinal vertical section of the casing;

Fig. 2, an end view, showing one side thereof partly in section;

Fig. 3, a plan of the lower half of the casing, the upper half being removed;

Fig. 4, a longitudinal vertical section of a modification; and

Fig. 5, a transverse section taken on the line 5, 5, Fig. 4.

The casing, as shown, comprises a cylindrical shell with three lateral web frames, preferably formed or cast integral therewith. It is centrally horizontally divided, the two halves 6 and 7 being substantially alike, each provided with one half of a web frame 8, centrally located, and of web frames 9, 9, located near the ends of the casing. Internal longitudinal flanges 10, are formed on one half of the shell, as the lower half 7, and against these flanges the lower parts of the upper half 6, seat, the two halves of the shell being held together by screws 11. Central bearings 12, are formed at the central junction of the web frames 9, 9, in alinement with a bearing 13, at the junction of the web frame 8, for the reception of the main shaft of the operating mechanism, and similarly formed bearings 14, 14, are located at each side of the central bearings for carrying the shafts of other devices, as those of the gong mechanism. At the lower parts of the webs in the lower half 7 are holes 15, 15, adapted to hold bearing shafts of guide pulleys, for directing the operating chains of the mechanism to and through openings 16, formed in the bottom of the lower half 7 of the casing.

All of the working parts and operating devices of the signaling apparatus, for which this casing is designed, are held in operative position and condition in the lower half 7, of the casing, thus affording free access thereto when the upper half of the casing is removed.

To adequately show the relation of the operating devices to the casing the main features thereof are illustrated by dotted lines; it being understood that the operating devices may be of any design or character and that the number and location of the bearings, shaft holes, &c., provided in the casing will vary, from what is shown in the drawings and here described, to accord with the construction of the particular mechanism used. 17 designates a number of pulleys, carrying chains 18; 19 guide pulleys for the chains; 20 a gong; and 21 the top of a pedestal support to which the casing may be secured in the usual manner.

The indicating dials of the apparatus, marked 22, may be fastened to the casing, and, for the purpose of this invention, they will be centrally horizontally divided, the upper and lower parts being secured by screws 23, to the divided web frames 9, 9, of the upper and lower halves of the casing respectively. To fully protect the mechanism plates or disks of glass 24, 24, also centrally horizontally divided, are suitably held at the ends of the two halves of the casing. For this purpose the ends of the casing are shown with socket formation, into which the two parts of the glass disks are seated and held therein by half rings 25, secured in place by screws 26.

The two halves 6 and 7 may, for convenience of manufacture, be made in sections, joined by socket connections 27, and held together by screws or rivets 28. Each section carries, or has formed integral therewith one half of a web frame.

So far this description applies to Figs. 1, 2, and 3, of the drawings; the corresponding parts of Figs. 4 and 5, are similarly designated. In this case the divided web frames 8 and 9, 9, are connected together by narrow bars 29, which may be cast or formed integral with frames, or be attached to them by any suitable means. The covering or outer cylindrical portion of the casing consists of sheet metal pieces 30, 31, bent semicircularly and attached to the bars 29, to the two halves of the casing by screws 32. The divided dials 22 will be secured to the web frames 9, 9, in manner before described. The centrally divided end glass plates 24, may be secured to the edges of the sheet metal covers 30, 31, by half flange rings 33, and screws 34.

We claim:

1. A casing for signaling apparatus, consisting of a cylindrical shell centrally horizontally divided and formed of sections circularly connected, and lateral web frames also centrally divided, the upper and lower parts of each frame being carried by a section of the upper and lower halves of the shell respectively.

2. A casing for signaling apparatus, comprising lateral web frames centrally horizontally divided, the lower parts of the frames being connected together to constitute the lower half of the casing, means in the lower half of the casing for holding all of the devices and working parts of signaling apparatus, the upper parts of the frames being connected together to constitute the upper half of the casing detachable from the lower half, leaving the devices and working parts of the signaling apparatus therein in operative condition.

3. A casing for signaling apparatus, comprising lateral web frames centrally horizontally divided, the lower parts of the frames being connected together to constitute the lower half of the casing, means in the lower half of the casing for holding all of the devices and working parts of signaling apparatus, the upper parts of the frames being connected together to constitute the upper half of the casing, dials centrally divided and attached to the divided end web frames and glass end covers centrally divided, the upper and lower halves of the dials and of the glass end covers being attached to the upper and lower parts of the casing respectively.

Signed at New York, county and State of New York, this 29 day of June, 1918.

JOHN ARTHUR KEESEY.
ALFRED SHEDLOCK.

In the presence of—
JOHN J. HAYDEN,
JAMES A. HUDSON.